US007868733B2

(12) United States Patent
Rhelimi

(10) Patent No.: US 7,868,733 B2
(45) Date of Patent: Jan. 11, 2011

(54) SYSTEM FOR IDENTIFYING AN INDIVIDUAL IN AN ELECTRONIC TRANSACTION

(75) Inventor: Alain Rhelimi, Saint-Cloud (FR)

(73) Assignee: Gemalto SA, Meudon Cedex (FR)

( * ) Notice: Subject to any disclaimer, the term of this patent is extended or adjusted under 35 U.S.C. 154(b) by 1062 days.

(21) Appl. No.: 10/583,020

(22) PCT Filed: Dec. 16, 2004

(86) PCT No.: PCT/IB2004/004156

§ 371 (c)(1), (2), (4) Date: Dec. 14, 2006

(87) PCT Pub. No.: WO2005/062236

PCT Pub. Date: Jul. 7, 2005

(65) Prior Publication Data

US 2007/0145119 A1 Jun. 28, 2007

(30) Foreign Application Priority Data

Dec. 18, 2003 (EP) ................................. 03293218

(51) Int. Cl.
*H04B 1/38* (2006.01)

(52) U.S. Cl. ....................... 340/5.61; 340/5.2; 380/270; 713/185

(58) Field of Classification Search ................... 340/5.8
See application file for complete search history.

(56) References Cited

U.S. PATENT DOCUMENTS 4,591,854 A * 5/1986 Robinson ................... 340/5.65
5,796,827 A * 8/1998 Coppersmith et al. ....... 713/182
5,914,701 A * 6/1999 Gersheneld et al. ......... 345/156
6,104,913 A * 8/2000 McAllister ................. 455/41.1
6,223,018 B1 * 4/2001 Fukumoto et al. .......... 455/41.1
6,441,721 B1 * 8/2002 Tajima et al. .......... 340/286.01

(Continued)

FOREIGN PATENT DOCUMENTS

DE 101 32 031 A1 1/2003

(Continued)

OTHER PUBLICATIONS

International Search Report dated Jun. 29, 2006 (8 pages).

(Continued)

*Primary Examiner*—Benjamin C Lee
*Assistant Examiner*—Curtis J King
(74) *Attorney, Agent, or Firm*—Osha • Liang LLP

(57) ABSTRACT

The system comprises a terminal (10, 12), an independent portable device (20) including a data processing means, and a wireless coupling means (RF COMMUNICATION) for exchanging individual-identification data between said terminal and said portable device. A body-medium communication means (OSC COMMUNICATION) including a transmitter in the terminal and a receiver in the portable device is provided to transmit from the terminal to the portable device a connection code (CONNECTION CODE) at the onset of a transaction upon physical contact established by the individual between the terminal and the portable device. A control means in the portable device checks said connection code received and conditionally issues to the terminal through said wireless coupling means (RF COMMUNICATION) a signal for enabling further execution of said transaction in response to said connection code complying with predetermined criteria.

10 Claims, 2 Drawing Sheets

U.S. PATENT DOCUMENTS

| | | | | |
|---|---|---|---|---|
| 6,864,780 | B2 * | 3/2005 | Doi et al. | 340/5.64 |
| 7,082,316 | B2 * | 7/2006 | Eiden et al. | 455/519 |
| 7,164,885 | B2 * | 1/2007 | Jonsson et al. | 455/41.2 |
| 7,202,773 | B1 * | 4/2007 | Oba et al. | 340/5.8 |
| 2002/0197956 | A1 * | 12/2002 | Annola et al. | 455/41 |
| 2004/0019571 | A1 * | 1/2004 | Hurwitz et al. | 705/65 |

FOREIGN PATENT DOCUMENTS

| | | | |
|---|---|---|---|
| EP | 1 013 517 | A2 | 6/2000 |
| EP | 1 033 687 | A2 | 9/2000 |
| EP | 1 239 420 | A1 | 9/2002 |

OTHER PUBLICATIONS

Inrternational Search Report for PCT/IB2004/004156 dated Oct. 27, 2005 (2 pages).

"Personal Area Networks: Near-field intrabody communication" Author: T.G. Zimmerman as published in IBM Systems Journal, vol. 35, Nos. 3 and 4 Accepted for Publication Apr. 8, 1996 (pp. 609-617).

* cited by examiner

SYSTEM FOR IDENTIFYING AN INDIVIDUAL IN AN ELECTRONIC TRANSACTION

Cross-reference to Related Applications

This application claims the benefit, pursuant to 35 U.S.C. §119, of Patent Cooperation Treaty Application No. PCT/IB2004/04156 filed on Dec. 16, 2004, which claims priority of European Patent Application No. 03293218.8 filed Dec. 18, 2003.

Background

1. Field of the Invention

The present invention generally relates to the identification of individuals in an electronic transaction.

2. Background

There are a large number of applications requiring identification of an individual such as: access control to restricted areas, transportation and electronic ticketing, authentication in commercial and financial transactions, access to computers and networks, road toll management, etc.

Electronic identification typically requires on one side a terminal connected to the system to be controlled, and on the other side a portable device, usually in the form of a chip card or badge being possessed by the individual requiring identification.

A coupling is performed between the terminal and the portable device, either through electric contacts or through wireless coupling, such as inductive or radiofrequency (RF) coupling, which technologies are becoming more and more popular since they do not require insertion of the card in a slot of the terminal.

Identification of the individual often requires the use of a password such as a PIN code and/or biometric data sensed from the individual. Whenever wireless coupling is used, further security features must be provided for, in order to avoid tampering by emulation of the exchange of signals required by the identification protocol between the terminal and the portable device.

The high level of security required in a number of applications has led to a multiplicity of specific solutions specially dedicated to the application concerned, leading to complex solutions with very poor flexibility, in addition to high cost for design and manufacture.

There is accordingly a need for a versatile, universal system, which might be manufactured at low cost in large quantities and easily adapted to a variety of different applications, yet being reliable and simple to use with a high level of security in the identification process.

SUMMARY OF THE INVENTION

It is therefore an object of the invention to provide such a system. The system of the invention is of the type comprising a terminal, an independent portable device including a data processing means, and a wireless coupling means for exchanging individual-identification data between said terminal and said portable device.

According to the invention, this system is characterised by further comprising a body-medium communication means including a transmitter in the terminal and a receiver in the portable device, said body-medium communication means being adapted to transmit from the terminal to the portable device a connection code at the onset of a transaction upon physical contact established by the individual between the terminal and the portable device. A control means in the portable device is adapted to check said connection code received and conditionally issue to the terminal through said wireless coupling means a signal for enabling further execution of said transaction in response to said connection code complying with predetermined criteria.

According to specific, preferred embodiments of the invention:

- said control means is further adapted to conditionally issue a signal for enabling the operation of said wireless coupling means before further execution of said transaction;
- said checking means in the portable device includes a biometric sensor for checking biometric data of the individual upon physical contact established by the individual, in particular one of a fingerprint sensor, a voiceprint sensor and a subcutaneous ultrasonic sensor;
- the system further includes a means for detecting an interruption of said physical contact established by the individual between the terminal and the portable device;
- said body-medium communication means includes Direct Sequence Spread Spectrum means, is a one-way and non-secure communication means, an/or is a non-secure communication means;
- the connection code transmitted to the portable device includes terminal-type identification data, said control means being further adapted to check said terminal-type identification data received by the portable device with respect to corresponding data stored in the portable device, and to conditionally issue said signal for enabling further execution of the transaction in response to said terminal-type identification data complying with corresponding data stored in the portable device;
- the connection code transmitted to the portable device includes first random data, said control means being further adapted to re-transmit said first random data to the terminal through said wireless coupling means, and the terminal being adapted to check said re-transmitted first random data with respect to said first data transmitted in the connection code;
- the connection code transmitted to the portable device includes second random data, said control means being further adapted to store said second random data received, the terminal being further adapted to issue a re-transmission request to the portable device through said wireless coupling means, said control means is further being adapted to re-transmit to the terminal said stored second random data upon reception of said re-transmission request, and the terminal being further adapted to check said re-transmitted second random data with respect to the initially transmitted second random data.

BRIEF DESCRIPTION OF THE DRAWINGS

The foregoing and other objects, aspects and advantages of the invention will be better understood from the following detailed description of a preferred embodiment of the invention with reference to the appended drawings, in which the same numerals refer to identical or functionally similar features over the different figures.

Detailed Description

Figure 1:
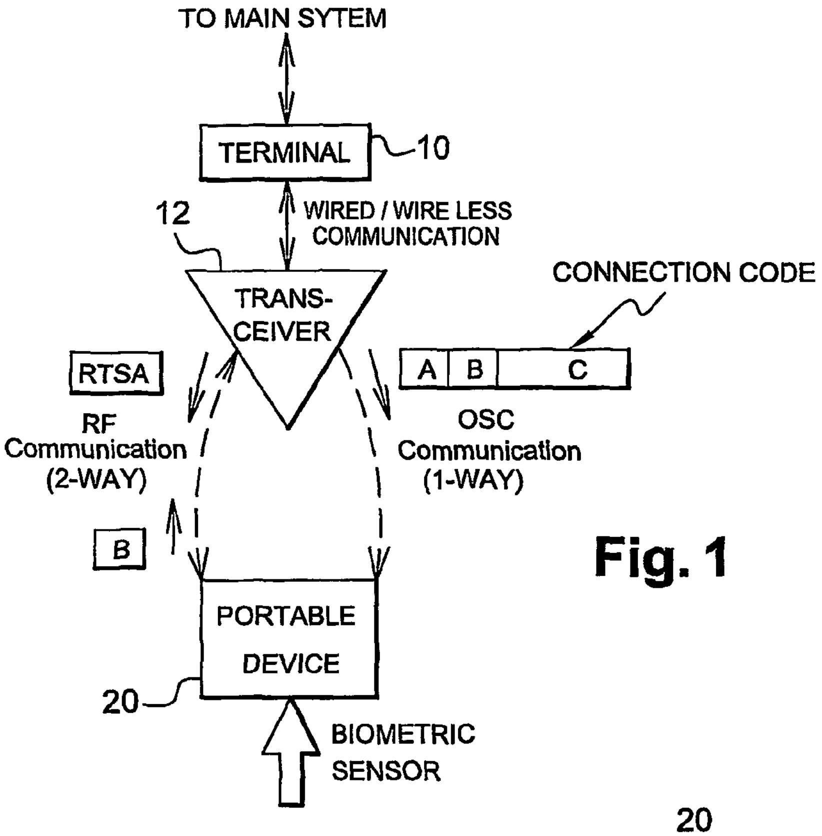
FIG. 1 schematically illustrates the essential integers of the invention and the way they mutually interact.

Referring now to the drawings, FIG. 1 shows the basic parts of the system of the invention, which essentially includes a terminal 10 connected to the main system to be controlled (mainframe computer, access control, etc.) and a portable device 20.

Terminal 10 is provided with a transceiver (transmitter-receiver) 12 which is placed at the immediate vicinity of the individual requesting identification, specifically at a location where the individual may have physical contact with the transceiver 12, e.g. by touching a metallic part such as a contact pad, handle, etc. of the same. Transceiver 12 is connected to the rest of the terminal 10 through bidirectional (wired or wireless) communication. The other essential part of the system is a portable device 20 which may be held by the individual requiring identification, specifically which may be physically contacted by this individual. This portable device is preferably embedded in an object such as a bracelet or wristwatch having a metallic back, enabling permanent electric contact with the body mass of the individual.

Two different communication channels may be established between transceiver 12 and portable device 20.

The first communication channel, which will be called "Over Skin Communication" (OSC), is a one-way, low data rate communication channel, from the transceiver 12 (which only includes OSC transmitter means) to the portable device 20 (which only includes OSC receiver means).

Essentially, OSC communication is a communication which makes use of the body mass of the individual as a communication medium (body-medium communication). This requires that the user physically contacts a suitable part of transceiver 12, on the one side, and a suitable part of portable device 20, on the other side, in order to enable OSC signals to be transmitted from the terminal to the portable device.

Details of OSC communication will be given below, in particular in reference to FIG. 3.

The second communication channel, which will be called "RF communication" is a two-way, high data rate communication channel between the transceiver 12 and the portable device 20, both being provided with RF transmitter and receiver means.

RF communication may be of any known wireless, short-range communication technique such as Bluetooth (IEEE 802.15.1), WPAN (IEEE 802.15.3), HiperLan 2, ETSI-BRAN, etc. All such communication standards enable two-way exchange of data at high rate (typically between 2 and 100 Mbit/s) at short range (typically several tens of centimeteres to several meteres) with low transmission power.

The first step of the identification procedure is the transmission from the terminal to the portable device of a so-called "connection code" through the OSC communication channel. Such a transmission may be initiated once the individual is physically in contact with some part of the transceiver 12 and also with some other part of the portable device 20 in order to connect both parts through the individual's body.

The connection code includes two random numbers A and B and a message C containing an identification of the class to which belongs the terminal.

Once the OSC receiver of the portable device has received the connection code, number A is retained in a store of the device. Data processing means included in the device 20 checks that the specific portable device having received the code does belong to the class of the terminal to which identification is requested. This is done by comparing the class identification included in message C to corresponding data stored in a memory of portable device 20.

Once it has been checked that the respective classes of the terminal and the portable device indeed match, the portable device initiates RF communication and publishes number B.

The RF signal including B is received by transceiver 12 of the terminal which checks that this number B is the same as the one that had initially been transmitted in the connection code. Such comparison is in particular intended to manage with the case where several portable devices would be simultaneously present in the environment of the transceiver 12, with the latter concurrently receiving several RF signals originating from different portable devices.

In a further step, the terminal transmits to the portable device through the RF communication channel a Request To Send number A (RTSA). This request is received by the portable device, which transmits through the RF communication channel the value A which had been retained in the store after reception of the connection code by the OSC receiver.

Once this check has been successfully performed, the transaction may further proceed between the terminal and the portable device, through the RF communication channel. The next time a connection will have to be initiated between the terminal and the portable device, new values of random numbers A and B will be chosen which are not determinable by any portable device.

A first advantage of the system of the invention that has been described is that identification may be performed—hence the transaction may proceed—only after the individual has physically contacted an equipment of the terminal, e.g. by touching a contact part (metallic pad, metallic handle, etc.) of the same by his hand or by the tip of his finger. This prohibits any use of the portable device without a voluntary action of the (fully identified) individual. This security feature is particularly important in portable devices making use of wireless communication in order to avoid any accidental of fraudulent establishment of an RF communication without the knowing and consent of the individual owning the card.

A second advantage of the invention is that it just requires a very short contact by the individual of the contact part of the terminal (e.g. just a touch) for OSC transmission of the connection code, nevertheless all further exchange of signals between terminal and portable device is performed through RF communication with high data rate and sophisticated techniques involving correction codes, ciphering, noise and interference rejection, etc.

The invention in particular permits to retain all advantages of an OSC communication (positive action of the individual required to initiate communication) without the drawbacks of the same (in particular the low data rate).

Besides, despite the fact that OSC communication requires a relatively high transmission power, since the invention OSC communication is only one-way there is no need to have an OSC transmitter in the portable device, which may be devised with low-consumption circuits and a small battery.

A further security level may be added by providing in the portable device a biometric identification device including a specific sensor such as a fingerprint sensor (either capacitive, thermal or optical sensor), a voiceprint sensor, a subcutaneous ultrasonic sensor, etc. Biometric identification will ascertain that the individual who bears the portable device and attempts to initiate OSC communication by physical contact with the terminal is indeed the authorized user, not e.g. an individual who had stolen the portable device of the authorized user.

Figure 2:
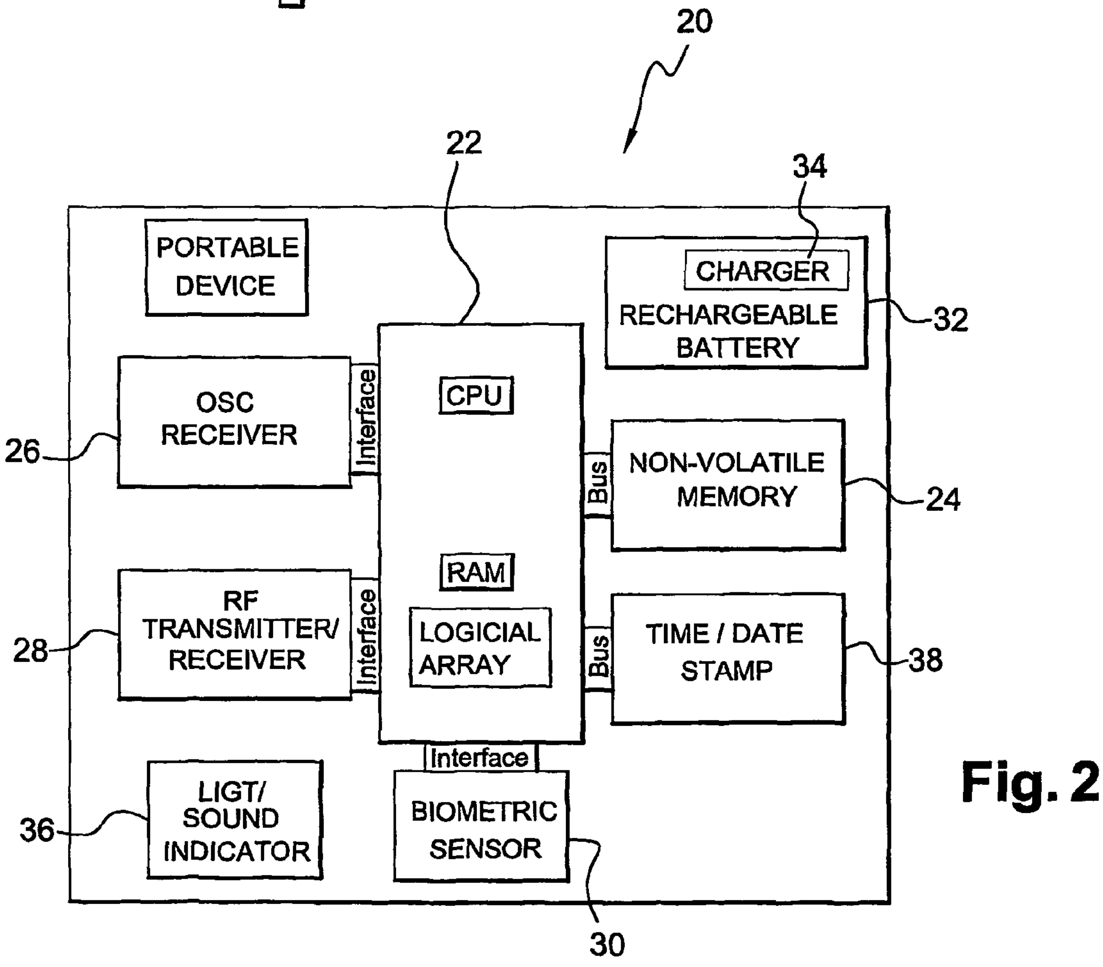
FIG. 2 is a diagram illustrating the various functional blocks making up the portable device of the invention.

FIG. 2 illustrates the main functional blocks of a preferred embodiment of the portable device 20.

A data processing means 22 includes a microcontroller with a CPU, RAM, etc. and a series of buses and interfaces for communication with a number of peripheral devices including a non-volatile memory 24, an OSC receiver 26, a RF transmitter/receiver 28, an optional biometric sensor 30, an optional light/sound indicator 36 and a time/date stamp circuit 38. The whole device is powered by a rechargeable battery 32 connected to a charger 34.

As far as the OSC receiver 26 is concerned, this is a device of a known type for receiving signals transmitted through the body of an individual. OSC communication is a known technique, studied in particular in papers by T. Zimmermann, who had devised a "Personal Area Network" limited to the extent of the body of an individual by making use of the biologic mass as a transmission medium.

Figure 3:
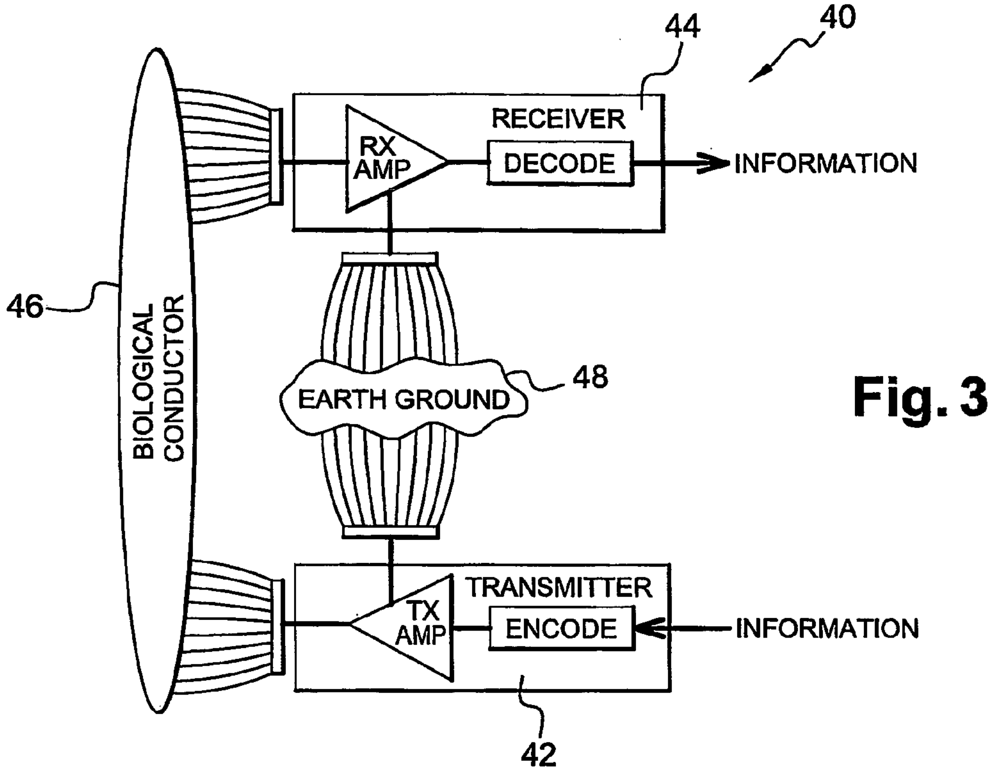
FIG. 3 is a schematic illustration explaining the body-medium type of communication used by the system of the invention.

FIG. 3 illustrates the principle of such a transmission, which is based on the use of quasi-electrostatic fields. An OSC system 40 includes a transmitter 42 and a receiver 44 coupled by a biological conductor 46, the return loop being through ground 48. Since the attenuation of the signal issued by the transmitter 42 is very high (typically 60 dB) arid mainly depends on the return through ground (10 fF), the transmission signal must be powerful enough to be correctly decoded by receiver 44. However, a lower amplitude may be chosen for the transmitted signal, by using a more sensitive receiver and interference-elimination techniques such as DSSS (Direct Sequence Spread Spectrum) techniques.

However, in any case, the data rate remains low, typically less than 10 kbit/s. Nevertheless, as explained above, the system of the invention just requires a very small data volume (a few hundreds of bits) to be received by the OSC receiver.

Since OSC involves a communication medium which is a part of the body of the individual, the OSC receiver 26 includes a sensing element which is in contact with the body of the individual, preferably in permanent contact. The portable device may also include a (not shown) device for detecting that the sensing element is indeed in contact with the body of the individual and has not been taken apart, and for inhibiting any operation of the device otherwise. Such a device may e.g. include an electric or thermal sensor for detecting heart beat; such sensors are well-known to the man skilled in the art and will not be further described. A preferential implementation is a portable device in the form of a wristwatch: if the watch is taken off from the arm of the user, the embedded electronic circuit of the portable device will be automatically deactivated.

Figure 4:
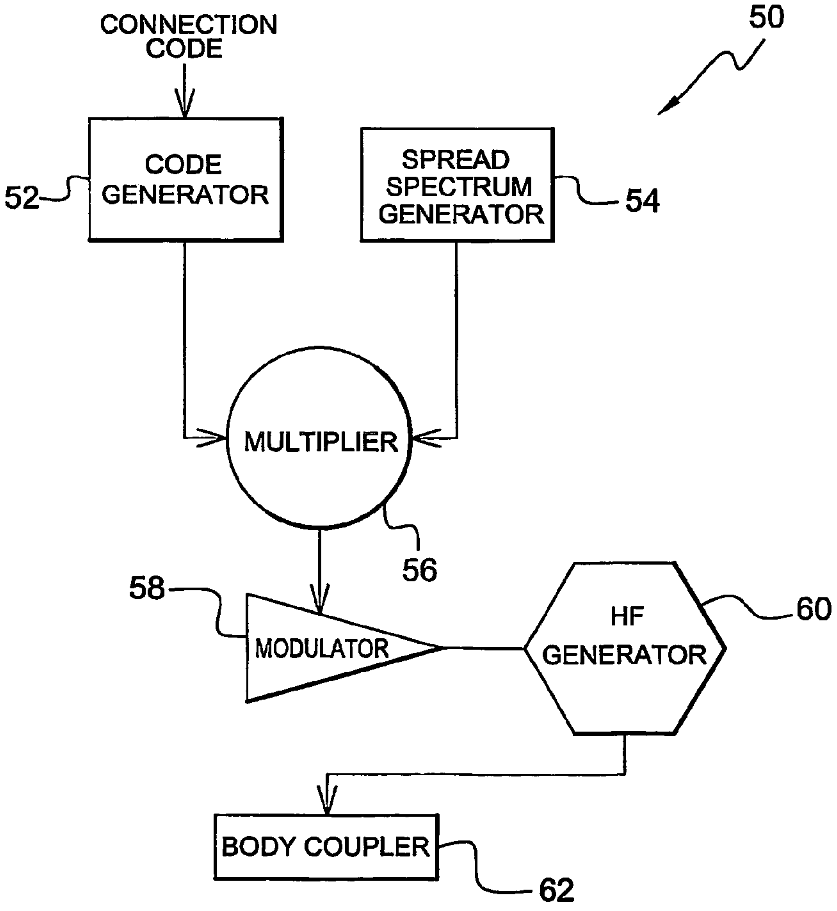
FIG. 4 schematically illustrates the functional blocs of the body-medium communication transmitter included in the terminal used by the system of the invention.

A typical arrangement of circuits for an OSC transmitter 50 (as the one included in transceiver 12 of the terminal) is shown on FIG. 4. It includes a code generator 52 receiving the connection code to be sent to the portable device, and a spread spectrum generator 54. Both signals are combined in a multiplier 56, which controls a modulator 58 driving an HF generator 60. The modulated HF signal is applied to a body coupler 62 for transmission to the portable device through the body mass of the individual.

Given the security features explained above, there is no need to cipher the information transmitted through OSC communication, which enables simple and robust signal transmission with low risk of signal loss or alteration.

Turning again to FIG. 2, in addition to OSC receiver 26, the portable device 20 includes also an RF transmitter/receiver 28 interfaced to processing means 22.

As mentioned above RF communication may be through any known means such as Bluetooth, WPAN, HiperLan 2, ETSI-BRAN, etc. The transmitter in the portable device is devised so as to have low consumption (less than 20 mW), thanks to low RF transmission power (less than 1 mW) due to the short range between the portable device and the terminal. Further, by implementing interference-reduction techniques such as DSSS, it is possible to keep a small size for the transmitter in the portable device, yet enabling high data rate (typically between 2 Mbits and 100 Mbit/s, depending on the requirements of the application). Reduction of interference may be obtained by techniques such as Direct Sequence Spread Spectrum (DSSS) modulation or any Other known technique well known from the man skilled in the art. RF communication may further implement an interoperability standard such as IETF-TLS and/or standard communication protocols such as TCP/IP.

The whole portable device 20 is powered by a rechargeable battery 32 combined with a charger 34. Charger 34 is preferably a non-contact charger, e.g. using magnetic induction, light cells, or an EM field receiver antenna.

It should be noted that in the standby state of the portable device only the OSC receiver 26 and the time/date stamp 38 are (partially) active. Once data signals are received by the OSC receiver 26, then all the main functions of the device, especially the data processing means 22, will be waked up. Since on normal use, i.e. excluding identification, the individual may be in contact with a wide variety of equipments possibly compatible with the system of the invention, a preliminary check upon the terminal class indicator received by the OSC receiver is performed before any activation of the biometric sensor 30 and of the RF transmitter/receiver 28. This avoids activating such modules—which require substantial power supply—only if the individual is in contact with a terminal actually corresponding to the class of equipment authorized (as stored in the memory of the portable device).

The time/date stamp circuit 38 is preferably adapted to be set through a communication network, e.g. by means of a network time protocol such as RFC 1119 and RFC 1305.

Indicator 36 may be a light indicator (LED or LCD display) and/or a buzzer, enabling a confirmation given to the individual of a positive (or negative) identification with respect to the system.

The invention described above may be used in a number of different applications.

A first typical application is in the telephone field, wherein the terminal is a mobilephone or a telephone handset incorporating a contact pad such that, once the phone is handed by the user bearing the portable device (e.g. in the form of a wristwatch in permanent contact with his body), the phone is automatically configured and adapted to receive phone calls. The phone may access a telephone directory stored in the portable device and/or automatically set preferential parameters of the user. Further, the call may be billed to a specific subscriber account, which details are stored in the portable device.

Another typical application is with vending machines, wherein the user has just to touch the drawer or door of the dispenser of the machine to enable the transaction, without any need to introduce money, credit card, etc. in the machine.

Other typical applications are in the field of conditional access (either physical or logical). For instance, it may be enough for the user to touch a computer to initiate the check of his authorization to access the computer or network and load a user profile in the computer, with no need to ask for a password. Means may be provided to automatically lock the computer if the user moves away from the computer to a distance which is not enough to maintain RF communication.

The portable device of the invention may also give access to a transportation means. This may be a personal transport means, the portable device functionally corresponding to the contact key of a car and further storing information about driving license, insurance, rental details, etc. The device may also enable an individual user to access public transportation just by pushing an access door (the physical contact with a terminal resulting from this contact with the door); by checking entry and exit points, the system may also bill the user automatically as a function Of the distance travelled.

Many other applications may as well take benefit of the advantages of the system of the invention, such as (the following list being of course not limited):

- storing of personal data with automatic conditional access;
- on-the-fly ciphering/deciphering and storing of data;
- access to restricted area: an electric lock or disablement of an alarm may be obtained just by contacting and turning the handle of a door;
- protection against hazardous appliances such as a guns, the system of the invention being implemented such that the gun can be triggered only by an authorized individual, who is identified automatically at the moment he grasps the handle of the gun;
- tracking of individuals in premises: every time the individual touches and opens a door, his is automatically identified by the system and the corresponding time and location are logged in a central database of the system;
- triggering an alarm when the individual moves away from the terminal at a distance which no longer enables safe RF communication;
- localisation of a person, just by letting him touch a special post having a known position: the system then automatically sends to a central site a message indicating position and identity of the requesting person.

What is claimed is:

1. A system for identifying an individual in an electronic transaction, said system comprising:

a terminal comprising a body coupler and a radiofrequency transceiver;

an independent portable device comprising an over skin communication receiver, a radiofrequency transceiver, and a biometric sensor; and wherein the terminal is configured to:

transmit through the body coupler a connection code to the independent portable device when a body of an individual makes physical contact with both the terminal and the independent portable device, wherein the connection code comprises a terminal identification class, and wherein the independent portable device is configured to:

remain in a low-powered stand-by mode until a data signal is received by the over skin receiver;

receive a data signal comprising the connection code by the over skin communication receiver;

transition to an active mode when the data signal is received;

determine the terminal identification class from the connection code;

obtain, using the biometric sensor, biometric data for a user of the independent portable device;

determine whether the user of the independent portable device is an authorized user; and when the user of the independent portable device is the authorized user:

establish communication with the terminal using the radiofrequency transceiver based on the terminal identification class.

2. The system as in claim 1, wherein said biometric sensor is one selected from the group consisting of a fingerprint sensor, a voiceprint sensor and a subcutaneous ultrasonic sensor.

3. The system as in claim 1, further comprising:

means for detecting an interruption of said physical contact established by the individual between the terminal and the independent portable device.

4. The system as in claim 1, wherein the independent portable device establishing communication with the terminal using the radiofrequency transceiver based on the terminal identification class comprises:

comparing the terminal identification class received by the independent portable device with data stored in the independent portable device; and sending a signal for enabling execution of a transaction when the terminal identification class matches with data stored in the independent portable device.

5. The system as in claim 1, wherein:

the connection code transmitted to the independent portable device by over skin communication further comprises a first random number, and wherein the independent portable device establishing communication with the terminal using the radiofrequency transceiver based on the terminal identification class comprises:

re-transmitting the first random number to the terminal using the radiofrequency transceiver, wherein the terminal is further configured to:

receive, using the radiofrequency transceiver, the first random number as re-transmitted by the independent portable device using the radiofrequency transceiver; and compare the re-transmitted first random number with the first number as transmitted in the connection code by the terminal through the body coupler.

6. The system as in claim 5, wherein:

the connection code transmitted to the independent portable device by over skin communication further comprises a second random number, and wherein the independent portable device establishing communication with the terminal using the radiofrequency transceiver based on the terminal identification class further comprises:

storing the second random number received; and re-transmitting to the terminal the stored second random number upon receiving a re-transmission request from the independent portable device, wherein the terminal is further configured to compare the re-transmitted second random number with the second random number as transmitted in the connection code by the terminal through the body coupler.

7. An independent portable device for use in a system configured to identify an individual in an electronic transaction, the independent portable device comprising:

a data processing means;

a radiofrequency transceiver for exchanging individual-identification data with a terminal;

an over skin communication receiver configured to receive from the terminal a connection code at the onset of a transaction when a body of an individual makes physical contact with both the terminal and the independent portable device, and a biometric sensor, wherein the independent portable device is configured to:

obtain, using the biometric sensor, biometric data for the user of the independent portable device;

determine that the user of the independent portable device is an authorized user;

determine a terminal identification class from the received connection code; and establish communication with the terminal using the radiofrequency transceiver based on the terminal identification class.

8. A terminal configured to identify an individual in an electronic transaction, comprising:

a radiofrequency transceiver for communicating with an independent portable device; and a body coupler configured to transmit to the independent portable device a connection code when a body of an individual makes physical contact with both the terminal and the independent portable device, wherein the connection code comprises a terminal identification class, a first random number, and a second random number, wherein the radiofrequency transceiver is configured to:

receive a first signal transmitted by a radiofrequency transceiver of the independent portable device when the class of the independent portable device matches the terminal identification class comprised in the connection code, wherein the first signal comprises the first random number;

transmit, to the independent portable device, a request for the second random number;

receive a second signal transmitted by the radiofrequency transceiver of the independent portable device, wherein the second signal comprises the second random number, wherein when (i) the first random number comprised in the first signal matches the first random number comprised in the connection code and (ii) the second random number comprised in the second signal matches the second random number comprised in the connection code, the terminal and the independent portable device are enabled to execute a transaction.

9. The system as in claim 1, wherein, when the independent portable device is in the low-powered stand-by mode:

the over skin communication receiver is active; and when the independent portable device transitions to an active mode:

the over skin communication receiver, the radiofrequency transceiver, and the biometric sensor are active.

10. A portable device, comprising:

a radiofrequency transceiver for exchanging individual-identification data with a terminal;

an over skin communication receiver configured to receive from the terminal a connection code at the onset of a transaction when a body of an individual makes physical contact with both the terminal and the portable device; and a biometric sensor, wherein the portable device is configured to:

remain in a low-powered stand-by mode until a data signal is received by the over skin receiver;

receive a data signal comprising the connection code by the over skin receiver;

transition to an active mode when the data signal is received;

determine a terminal identification class from the received connection code;

obtain, using the biometric sensor, biometric data for the user of the portable device;

determine whether the user of the portable device is an authorized user; and when the user of the portable device is the authorized user:

establish communication with the terminal using the radiofrequency transceiver based on the terminal identification class.

* * * * *

UNITED STATES PATENT AND TRADEMARK OFFICE

CERTIFICATE OF CORRECTION

PATENT NO. : 7,868,733 B2
APPLICATION NO. : 10/583020
DATED : January 11, 2011
INVENTOR(S) : Alain Rhelimi It is certified that error appears in the above-identified patent and that said Letters Patent is hereby corrected as shown below:

Title page Item (30) Foreign Application Priority Data number reads "03293218" and should read -- 03293218.8 --

Signed and Sealed this
Third Day of May, 2011

David J. Kappos
*Director of the United States Patent and Trademark Office*